Nov. 21, 1967  F. J. MONTELEONE, JR  3,353,561
PASS TUBE FOR GAMMA RAY DENSITOMETERS
Filed Nov. 20, 1963  2 Sheets-Sheet 1

Frank J. Monteleone Jr. INVENTOR.

BY

ATTORNEY

United States Patent Office 3,353,561
Patented Nov. 21, 1967

3,353,561
PASS TUBE FOR GAMMA RAY DENSITOMETERS
Frank J. Monteleone, Jr., Huntsville, Ala., assignor to Thiokol Chemical Corporation, Bristol, Pa., a corporation of Delaware
Filed Nov. 20, 1963, Ser. No. 325,034
2 Claims. (Cl. 138—37)

This invention relates to improvements in pass tubes for gamma ray densitometers and, more particularly, it is directed to an elliptically-formed pass tube that will permit a more thorough inspection of the flow of an uncured solid propellant during the casting operation of a rocket motor for the purpose of detecting defects therein without changing the flow velocity of the uncured solid propellant or creating any pressure drop in the uncured solid propellant that would greatly affect the over-all casting time of the rocket motor.

At the present time, pass tubes of cylindrical formation are being used for this purpose in point source gamma ray densitometers. Such a formation permits only the inspection of approximately 50% of the flow of solid propellant, while the same time such inspection may not detect volumes of air or considerable dimension. Since most defects are created by entrapped air, the failure to detect this air in the propellant would permit imperfect solid propellant to be cast into a rocket motor.

It is an object of this invention, therefore, to provide an elliptically-shaped pass tube that permits the concentration of the flow area of thinner cross-section in the gamma ray beam from a point source.

In this way, inspection of approximately 95% of the flowing propellant is achieved. If the invention is used with a strip source gamma ray densitometer, 100% inspection of flowing propellant can be accomplished; and detection sensitivity can be improved by substantially reducing the length of the propellant through which the gamma rays travel.

The elliptically-shaped pass tube minimizes disruption of propellant flow pattern, thus eliminating any possibility of air entrapment even during the initial propellant processing stages. This is in sharp contradistinction to that of a pass tube of rectangular cross-section where square corners and abrupt turns are conducive to entrapment of air that later could produce defects in the solid propellant.

Another object of the invention is to provide a pass tube through which propellant flow velocity is constant and process line pressure losses due to propellant flowing are minimized so the casting time of rocket motors is not increased by inclusion of this invention in the process line.

With the above and other objects and advantages in view, the invention consists of the novel details of construction, arrangement and combination of parts more fully hereinafter described, claimed, and illustrated in the accompanying drawings in which:

Figure 1:
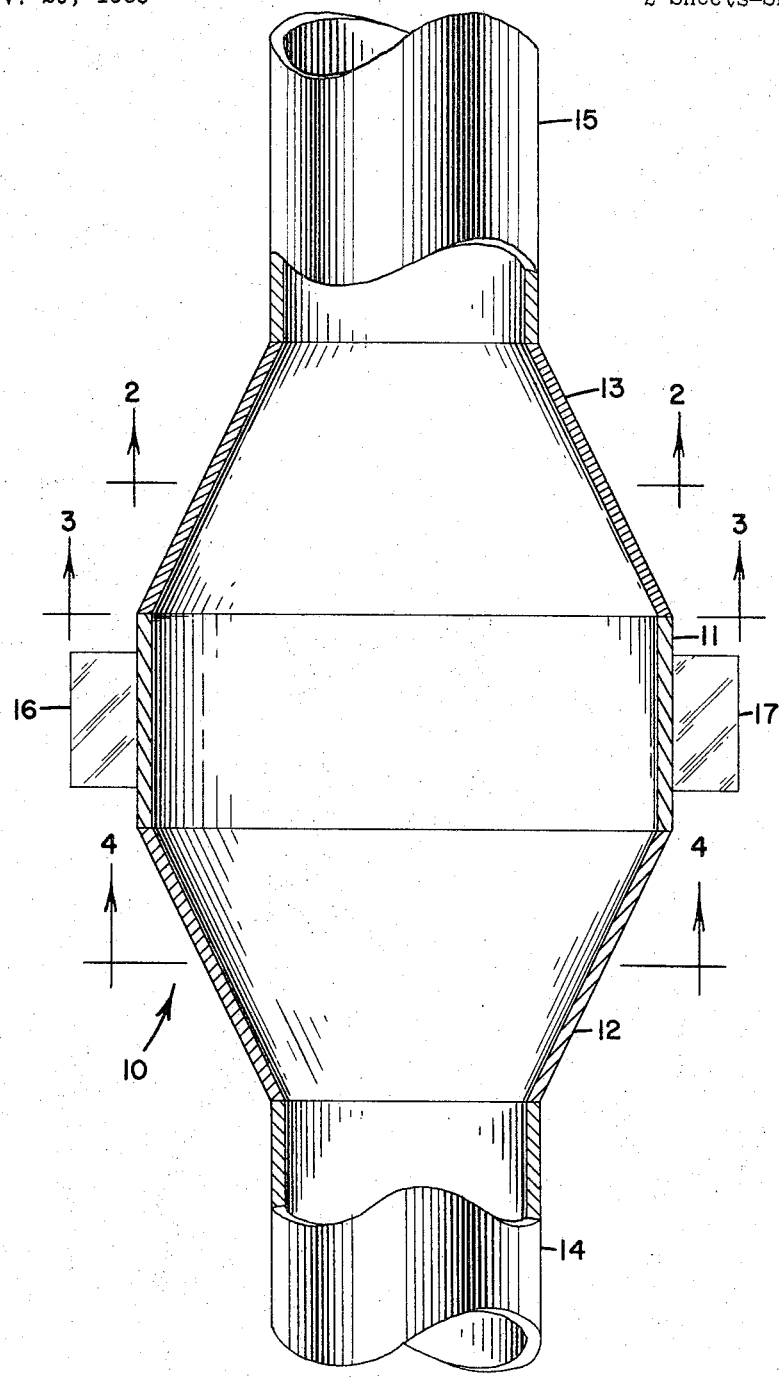
FIGURE 1 is a longitudinal cross-sectional view, partly in elevation and partly broken away, of a pass tube embodying the instant invention.
Figure 2:
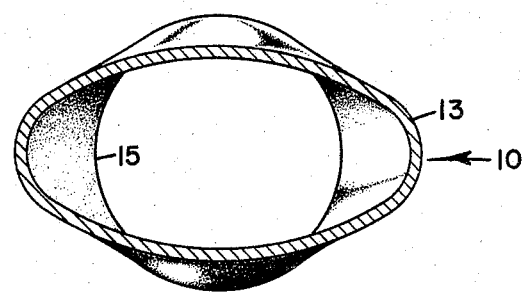
FIGURE 2 is a transverse sectional view on the line 2—2 of FIGURE 1.
Figure 3:
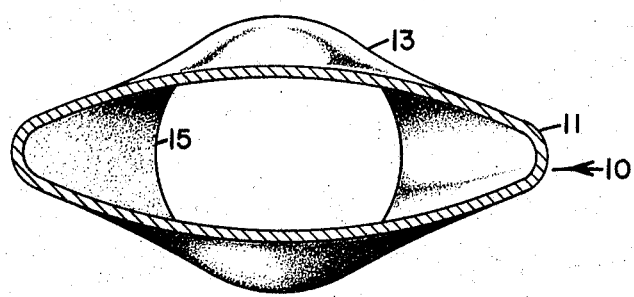
FIGURE 3 is a transverse sectional view on the line 3—3 of FIGURE 1.
Figure 4:
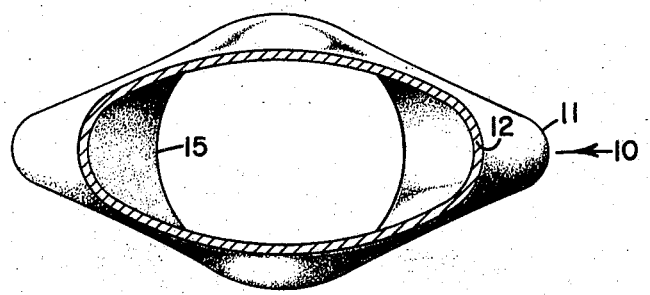
FIGURE 4 is a transverse sectional view on the line 4—4 of FIGURE 1 with certain parts of FIGURE 1 removed to more clearly show the formation of the pass tube embodying the instant invention.

Referring more in detail to the drawings wherein like parts are designated by like reference numerals, the reference numeral 10 is used to generally designate a pass tube embodying the instant invention.

The pass tube 10 comprises an elliptically-shaped medial or inspection area 11 which merges at one edge thereof into a substantially frusto-conical, elliptical flow area 12 and, at the opposite edge thereof, merges into a similarly contoured flow area 13.

The flow area 12 merges into a cylindrical outlet pipe 14 while the flow area 13 merges into a cylindrical inlet pipe 15; thus the flow of uncured solid propellant will enter the pass tube 10 by means of the inlet pipe 15 and emerge therefrom by means of the outlet pipe 14. During the flow of the solid propellant, the area 11 which is known as the inspection zone will be under the influence of a gamma ray source unit 16 and a gamma ray detector unit 17—both of which are well-known in the art relating to densitometers.

All transverse cross-sections of the pass tube 10 are equal to the area of the cross-sections of the inlet and outlet pipes 14 and 15 so that the velocity of the flow of the solid propellant or the pressure drop of the flow of solid propellant is not materially affected as the solid propellant flows through the pass tube 10.

In conventional pass tubes, the cross-sectional area of the inspection portion thereof is a continuation of the cross-sectional areas of the inlet and outlet pipes; thus there is no diminishing of the depth of the cross-sectional area of the inspection portion to permit inspection of a thinner but deeper flow of solid propellant.

The peculiar shape of the areas 12 and 13 prevent surging of the solid propellant and the entrapment of air in any area of the pass tube 10, as would occur if the cross-sectional areas of the pass tube 10 were not carefully calibrated to equal the cross-sectional areas of the inlet and outlet pipes 14 and 15.

Of the many shapes that were used during the development of the pass tube 10, none were as efficient or as positive in the results obtained as was the elliptically-shaped pass tube 10 embodying the present invention.

The volume of solid propellant flowing through the pass tube 10 is determined by the size of the inlet and outlet pipes 14 and 15, since the cross-sectional areas 11, 12 and 13 are calibrated to conform to the cross-sectional areas of the inlet and outlet pipes 14 and 15.

For simplicity only, the point source gamma ray source detection system is shown in the figures. The strip source gamma ray system could utilize the invention to excellent advantage. When the strip source gamma detection system is used, it is necessary to align the inspection area so that the rays pass through the flat side affording less absorbence of gamma rays by propellant as well as possible improvement in the response time of the strip source unit to a defect in the propellant viewed.

It is believed that the manner of use and the construction of the embodiment of the invention previously described will be apparent to those skilled in the art; and it is to be understood that variations thereof may be adhered to providing such variations fall within the spirit of the invention and the scope of the appended claims.

Having thus described the invention, what is claimed as new and desired to be secured by Letters Patent is:

1. A pass tube for use with gamma ray densitometers compirsing a substantially frustro-conical, elliptically-shaped inspection area that is contiguous with cylindrical inlet and outlet pipes, and the cross-sectional dimensions of said inspection area are equal to the cross-sectional dimensions of said inlet and outlet pipes.

2. A pass tube for use with gamma ray densitometers comprising a medical inspection portion of substantially elliptical formation having at each opposite edge thereof and contiguous therewith a substantially frustro-conical, elliptically-shaped flow portion, each of said flow portions having a cylindrical portion contiguous with the outer edge thereof and the cross-sectional areas of said inspection portion and said flow portions are equal to the cross-sectional areas of said cylindrical portions.

References Cited

UNITED STATES PATENTS

| | | | |
|---|---|---|---|
| 2,343,560 | 3/1944 | Klein et al. | 138—37 |
| 2,397,655 | 4/1946 | Francis | 138—177 X |
| 2,953,681 | 9/1960 | Frazier | 250—43.5 |
| 3,070,692 | 12/1962 | Ohmart et al. | 250—43.5 |

FOREIGN PATENTS 1,163,759   2/1964   Germany.

LAVERNE D. GEIGER, *Primary Examiner.*

B. KILE, T. MOOREHEAD, *Assistant Examiners.*